United States Patent
Li et al.

(10) Patent No.: US 12,165,335 B2
(45) Date of Patent: *Dec. 10, 2024

(54) EFFICIENT HUMAN POSE TRACKING IN VIDEOS

(71) Applicant: Snap Inc., Santa Monica, CA (US)

(72) Inventors: Yuncheng Li, Los Angeles, CA (US); Linjie Luo, Los Angeles, CA (US); Xuecheng Nie, Singapore (SG); Ning Zhang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,335

(22) Filed: Sep. 1, 2023

(65) Prior Publication Data
US 2024/0062390 A1    Feb. 22, 2024

Related U.S. Application Data

(63) Continuation of application No. 17/660,462, filed on Apr. 25, 2022, now Pat. No. 11,783,494, which is a (Continued)

(51) Int. Cl.
*G06T 7/246* (2017.01)
*G06T 7/73* (2017.01)
(Continued)

(52) U.S. Cl.
CPC .............. *G06T 7/246* (2017.01); *G06T 7/73* (2017.01); *G06V 10/764* (2022.01); *G06V 10/82* (2022.01);
(Continued)

(58) Field of Classification Search
CPC .............................. G06V 20/46; G06V 40/23
See application file for complete search history.

(56) References Cited

U.S. PATENT DOCUMENTS 5,880,731 A    3/1999   Liles et al.
6,023,270 A    2/2000   Brush, II et al.
(Continued)

FOREIGN PATENT DOCUMENTS

CN    109863532 A    6/2019
CN    110168478 A    8/2019
(Continued)

OTHER PUBLICATIONS

"U.S. Appl. No. 16/206,684, Notice of Allowance mailed Apr. 22, 2020", 8 pgs.
(Continued)

*Primary Examiner* — Edward Park
(74) *Attorney, Agent, or Firm* — Schwegman Lundberg & Woessner, P.A.

(57) ABSTRACT

Systems, devices, media and methods are presented for a human pose tracking framework. The human pose tracking framework may identify a message with video frames, generate, using a composite convolutional neural network, joint data representing joint locations of a human depicted in the video frames, the generating of the joint data by the composite convolutional neural network done by a deep convolutional neural network operating on one portion of the video frames, a shallow convolutional neural network operating on a another portion of the video frames, and tracking the joint locations using a one-shot learner neural network that is trained to track the joint locations based on a concatenation of feature maps and a convolutional pose machine. The human pose tracking framework may store, the joint locations, and cause presentation of a rendition of the joint locations on a user interface of a client device.

20 Claims, 14 Drawing Sheets

Related U.S. Application Data continuation of application No. 16/949,594, filed on Nov. 5, 2020, now Pat. No. 11,315,259, which is a continuation of application No. 16/206,684, filed on Nov. 30, 2018, now Pat. No. 10,861,170.

(51) Int. Cl.
  *G06V 10/764* (2022.01)
  *G06V 10/82* (2022.01)
  *G06V 20/40* (2022.01)
  *G06V 40/20* (2022.01)
  *G06F 3/04817* (2022.01)
  *H04L 51/04* (2022.01)
  *H04L 67/01* (2022.01)

(52) U.S. Cl.
  CPC .......... *G06V 20/46* (2022.01); *G06V 40/23* (2022.01); *G06F 3/04817* (2013.01); *G06T 2200/24* (2013.01); *G06T 2207/10016* (2013.01); *G06T 2207/20081* (2013.01); *G06T 2207/20084* (2013.01); *G06T 2207/30196* (2013.01); *H04L 51/04* (2013.01); *H04L 67/01* (2022.05)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,803,602 B2* | 10/2020 | Kim .................. G06T 7/248 |
| 10,861,170 B1 | 12/2020 | Li et al. |
| 11,315,259 B2* | 4/2022 | Li .................. G06T 7/73 |
| 11,783,494 B2 | 10/2023 | Li et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |

(56) References Cited

U.S. PATENT DOCUMENTS

| | | |
|---|---|---|
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0154212 A1 | 6/2017 | Feris et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0115503 A1 | 4/2018 | Baldwin et al. |
| 2018/0225517 A1 | 8/2018 | Holzer et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0336434 A1 | 11/2018 | Kicanaoglu et al. |
| 2019/0001223 A1 | 1/2019 | Blackstock et al. |
| 2019/0026917 A1 | 1/2019 | Liao et al. |
| 2019/0057616 A1 | 2/2019 | Cohen et al. |
| 2019/0147621 A1 | 5/2019 | Alesiani et al. |
| 2019/0188920 A1 | 6/2019 | Mcphee et al. |
| 2019/0297326 A1* | 9/2019 | Reda .................. G06T 5/20 |
| 2019/0303715 A1* | 10/2019 | Jiang .............. G06F 18/24137 |
| 2020/0027271 A1 | 1/2020 | Guay et al. |
| 2021/0125342 A1 | 4/2021 | Li et al. |
| 2023/0010480 A1 | 1/2023 | Li et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 16/206,684, Notice of Allowance mailed Jul. 29, 2020", 9 pgs.

"U.S. Appl. No. 16/949,594, Notice of Allowance mailed Dec. 24, 2021", 10 pgs.

"U.S. Appl. No. 16/949,594, Preliminary Amendment filed Jan. 15, 2021", 8 pgs.

"U.S. Appl. No. 17/660,462, Non Final Office Action mailed Feb. 9, 2023", 6 pgs.

"U.S. Appl. No. 17/660,462, Notice of Allowance mailed Jun. 2, 2023", 9 pgs.

"U.S. Appl. No. 17/660,462, Preliminary Amendment filed Oct. 6, 2022", 7 pgs.

"U.S. Appl. No. 17/660,462, Response filed May 9, 2023 to Non Final Office Action mailed Feb. 9, 2023", 8 pgs.

Henriques, Joao F., et al., "High-Speed Tracking with Kernelized Correlation Filters", IEEE Transactions on Pattern Analysis and Machine Intelligence, (2015), 14 pgs.

Luo, Yue, et al., "LSTM Pose Machines", arXiv:1712.06316v4, (Mar. 9, 2018), 9 pgs.

Wei, Shih-En, et al., "Convolutional Pose Machines", IEEE Conference on Computer Vision and Pattern Recognition; arXiv:1602.00134v4, (2016), 9 pgs.

* cited by examiner

EFFICIENT HUMAN POSE TRACKING IN VIDEOS

CLAIM OF PRIORITY

This application is a continuation of U.S. patent application Ser. No. 17/660,462, filed on Apr. 25, 2022, which is a continuation of U.S. patent application Ser. No. 16/949,594, filed on Nov. 5, 2020, now issued as U.S. Pat. No. 11,315,259, which is a continuation of U.S. patent application Ser. No. 16/206,684, filed on Nov. 30, 2018, now issued as U.S. Pat. No. 10,861,170, each of which are incorporated herein by reference in their entireties.

TECHNICAL FIELD

Embodiments of the present disclosure relate generally to human pose tracking in videos using convolutional neural networks.

BACKGROUND

A neural network, sometimes referred to as an artificial neural network, is a computing system based on the consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A long short-term memory (LSTM) serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks use "features" for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Human pose tracking aims to track articulated body joints in monocular videos. Human pose tracking in videos poses a challenging problem because of appearance changes, large pose deformations, occlusions and other complex interactions between humans and objects. Leveraging temporal information across video frames can improve the consistency and efficiency of the human pose tracking problem. Described in detail below is a composite convolutional neural network model, according to some example embodiments, that is trained to exploit temporal information across video frames in order to improve efficiency and accuracy in human pose tracking.

Figure 1:
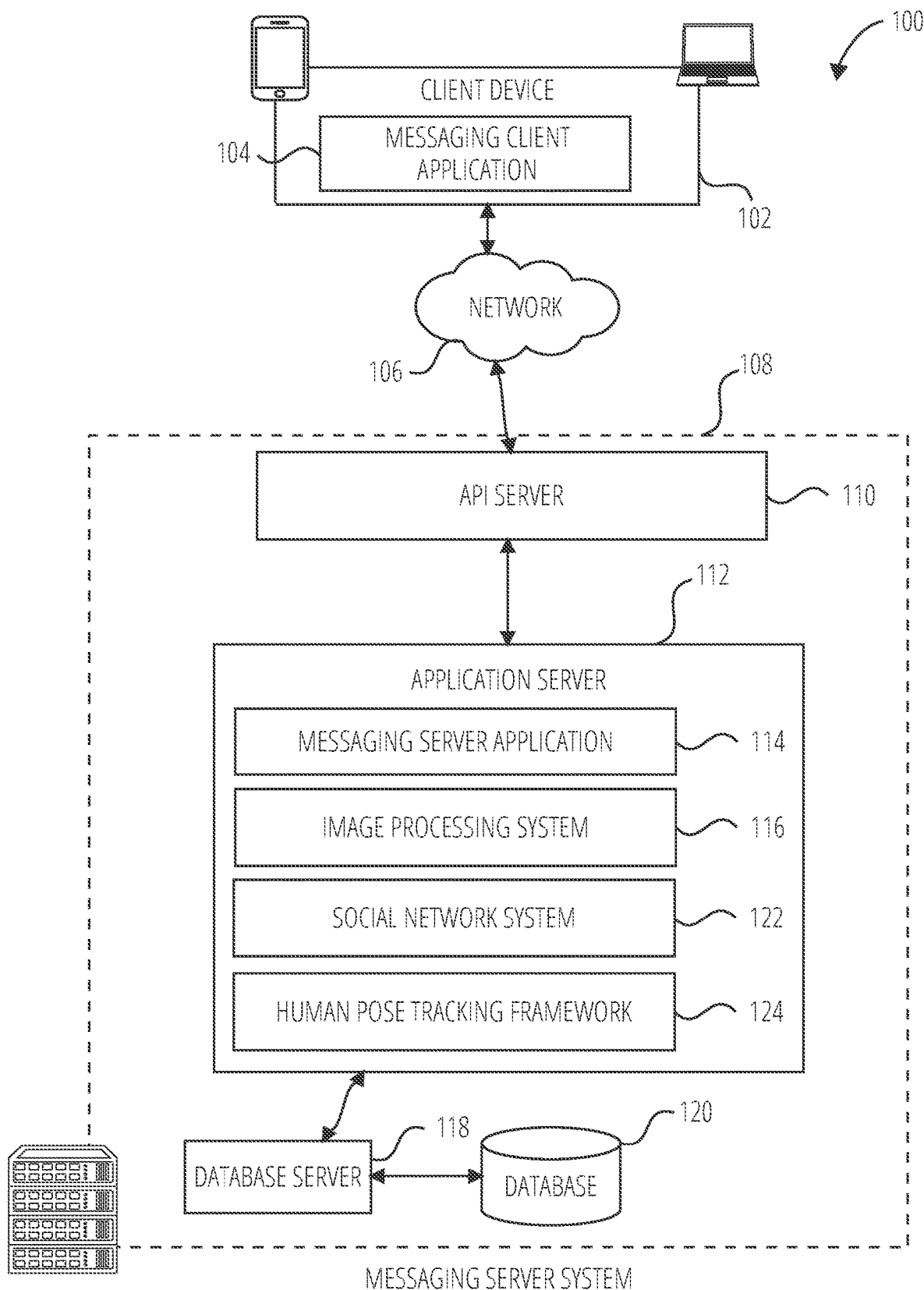
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts several applications including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The human pose tracking framework 124 may be integrated within an application server 112. The human pose tracking framework 124 may be coupled with a messaging server application, 114, image processing system 116 and a social network system 122. The human pose tracking framework 124 may use video data captured by a camera component of a client device 102. The human pose tracking framework 124 may transmit data to the messaging client application 104 via the network 106. Further detail regarding the human pose tracking framework 124 will be discussed below. The application server 112 is communicatively coupled to a database server 118, which facilitates access to a database 120 in which is stored data associated with messages processed by the messaging server application 114.

Figure 2:
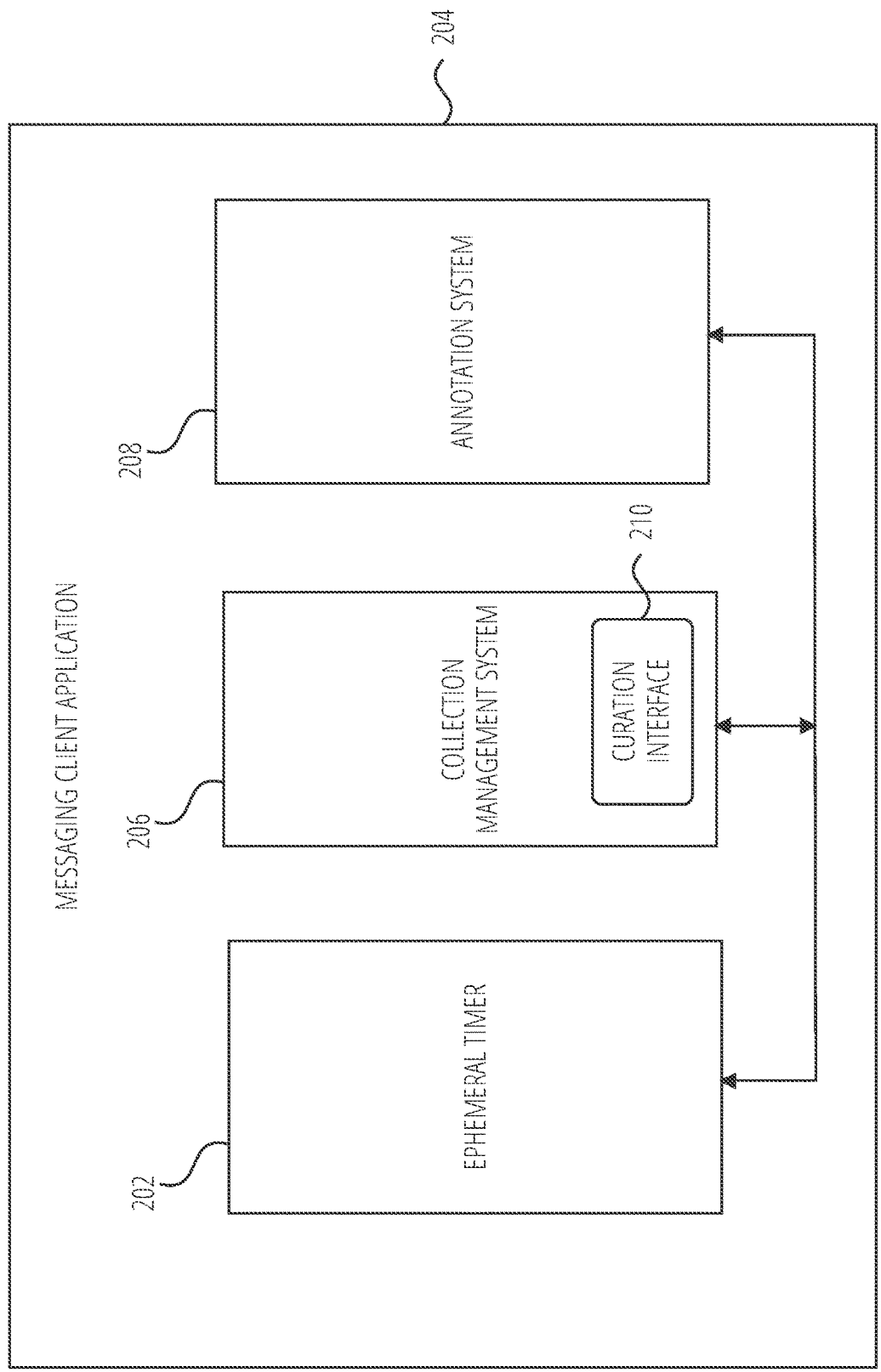
FIG. 2 is block diagram illustrating further details regarding a messaging system, according to example embodiments.

FIG. 2 is block diagram illustrating further details regarding the messaging system, 100, according to example embodiments. Specifically, the messaging system 100 is shown to comprise a messaging client application 204 and the application server 112, which in turn embody a number of some subsystems, namely an ephemeral timer system 202, a collection management system 206 and an annotation system 208.

The ephemeral timer system 202 is responsible for enforcing the temporary access to content permitted by the messaging client application 204 and the messaging server application 114. To this end, the ephemeral timer system 202 incorporates multiple timers that, based on duration and display parameters associated with a message, or collection of messages (e.g., a story), selectively display and enable access to messages and associated content via the messaging client application 204. Further details regarding the operation of the ephemeral timer system 202 are provided below.

The collection management system 206 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 206 may also be responsible for publishing an icon that provides notification of the existence of a particular collection to the user interface of the messaging client application 204.

The collection management system 206 furthermore includes a curation interface 210 that allows a collection manager to manage and curate a particular collection of content. For example, the curation interface 210 enables an event organizer to curate a collection of content relating to a specific event (e.g., delete inappropriate content or redundant messages). Additionally, the collection management system 206 employs machine vision (or image recognition technology) and content rules to automatically curate a content collection. In certain embodiments, compensation may be paid to a user for inclusion of user-generated content into a collection. In such cases, the curation interface 210 operates to automatically make payments to such users for the use of their content.

The annotation system 208 provides various functions that enable a user to annotate or otherwise modify or edit media content associated with a message. For example, the annotation system 208 provides functions related to the generation and publishing of media overlays for messages processed by the messaging system 100. The annotation system 208 operatively supplies a media overlay, modification, enhancement or effect (e.g., a filter) to the messaging client application 204 based on a geolocation of the client device 102. In another example, the annotation system 208 operatively supplies a media overlay to the messaging client application 204 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 208 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 208 provides a user-based publication platform that enables users to select a geolocation on a map, and upload content associated with the selected geolocation. The user may also specify circumstances under which a particular media overlay should be offered to other users. The annotation system 208 generates a media overlay that includes the uploaded content and associates the uploaded content with the selected geolocation.

In another example embodiment, the annotation system 208 provides a merchant-based publication platform that enables merchants to select a particular media overlay associated with a geolocation via a bidding process. For example, the annotation system 208 associates the media overlay of a highest bidding merchant with a corresponding geolocation for a predefined amount of time.

Figure 3:
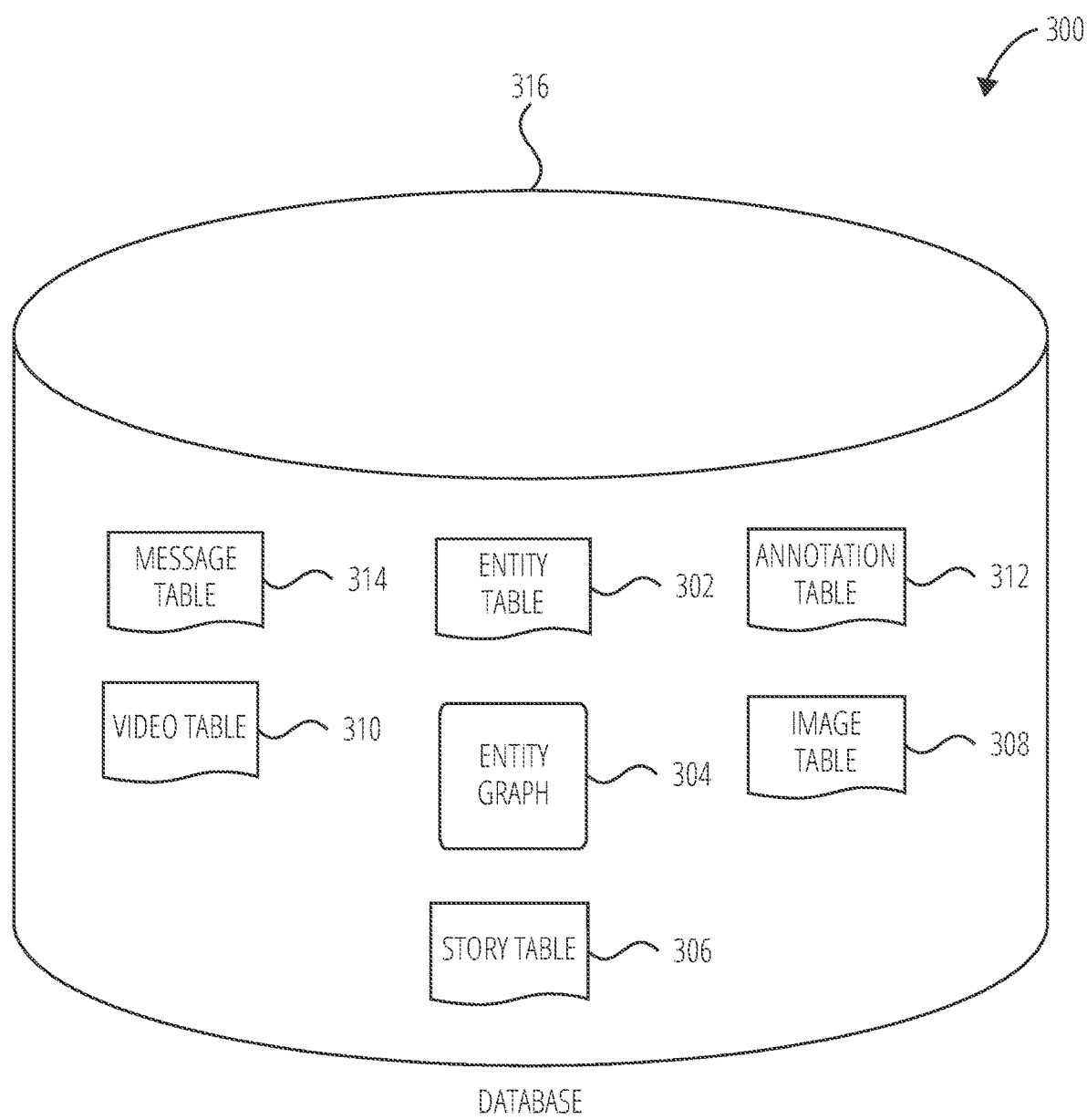
FIG. 3 is a schematic diagram illustrating data which may be stored in the database of the messaging server system, according to certain example embodiments.

FIG. 3 is a schematic diagram illustrating data 300 which may be stored in the database 316 of the messaging server system 108, according to certain example embodiments. While the content of the database 316 is shown to comprise a number of tables, it will be appreciated that the data could be stored in other types of data structures (e.g., as an object-oriented database).

The database 316 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 316 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a global positioning system (GPS) unit of the client device 102. Another type of filer is a data filer, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314.

Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
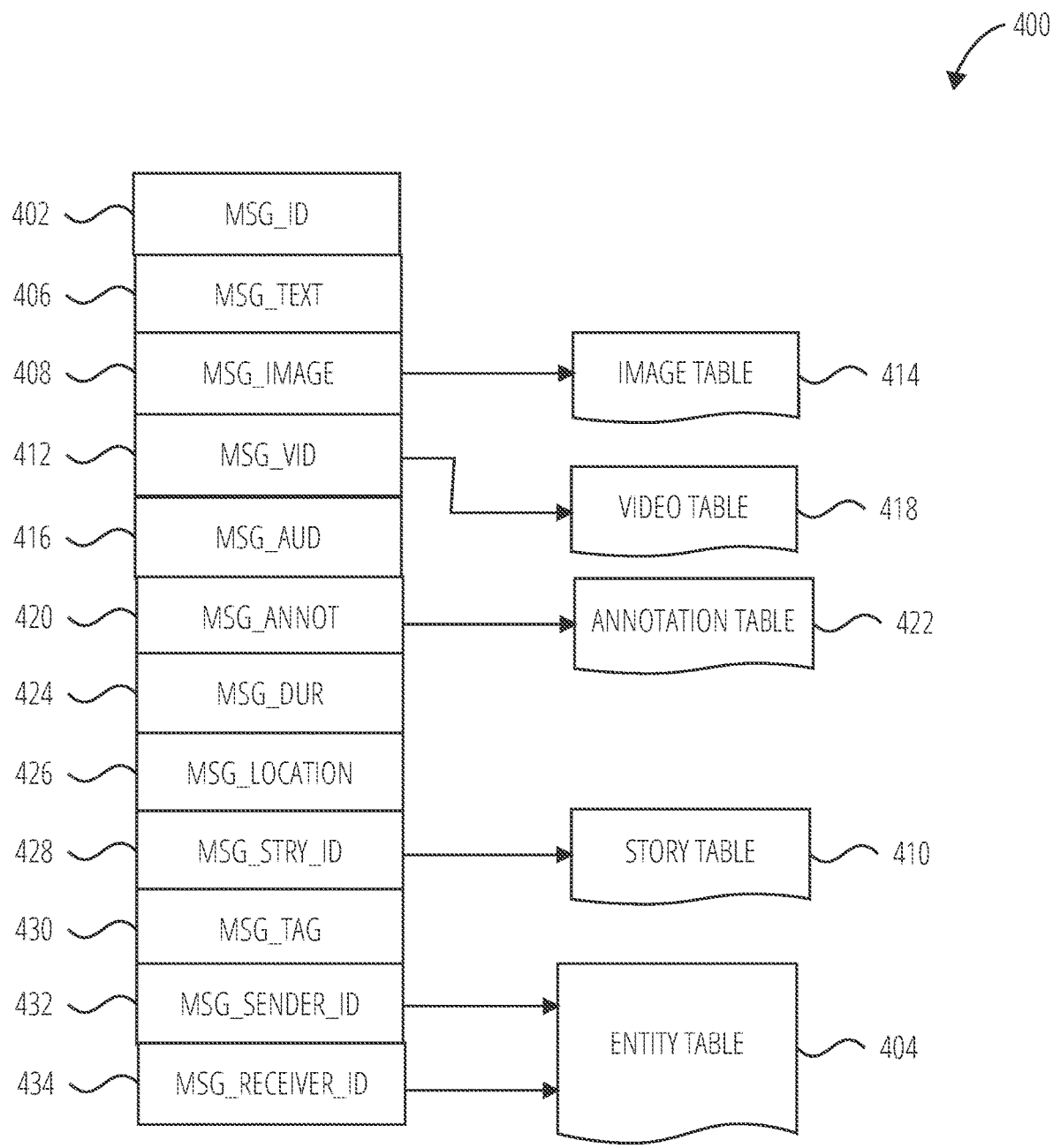
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 406: text, to be generated by a user via a user interface of the client device 102 and that is included in the message 400

A message image payload 408: image data, captured by a camera component of a client device 102 or retrieved from memory of a client device 102, and that is included in the message 400.

A message video payload 412: video data, captured by a camera component or retrieved from a memory component of the client device 102 and that is included in the message 400.

A message audio payload 416: audio data, captured by a microphone or retrieved from the memory component of the client device 102, and that is included in the message 400.

A message annotation 420: annotation data (e.g., filters, stickers or other enhancements) that represents annotations to be applied to message image payload 408, message video payload 412, or message audio payload 416 of the message 400.

A message duration parameter 424: parameter value indicating, in seconds, the amount of time for which content of the message (e.g., the message image payload 408, message video payload 412, message audio payload 416) is to be presented or made accessible to a user via the messaging client application 104 (deleted).

A message geolocation parameter 426: geolocation data (e.g., latitudinal and longitudinal coordinates) associated with the content payload of the message. Multiple message geolocation parameter 426 values may be included in the payload, each of these parameter values being associated with respect to content items included in the content (e.g., a specific image into within the message image payload 408, or a specific video in the message video payload 412).

A message story identifier 428: identifier values identifying one or more content collections (e.g., "stories") with which a particular content item in the message image payload 408 of the message 400 is associated. For example, multiple images within the message image payload 408 may each be associated with multiple content collections using identifier values.

A message tag 430: each message 400 may be tagged with multiple tags, each of which is indicative of the subject matter of content included in the message payload. For example, where a particular image included in the message image payload 408 depicts an animal (e.g., a lion), a tag value may be included within the message tag 430 that is indicative of the relevant animal. Tag values may be generated manually, based on user input, or may be automatically generated using, for example, image recognition.

A message sender identifier 432: an identifier (e.g., a messaging system identifier, email address or device identifier) indicative of a user of the client device 102 on which the message 400 was generated and from which the message 400 was sent A message receiver identifier 434: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 408 may be a pointer to (or address of) a location within an image table 414. Similarly, values within the message video payload 412 may point to data stored within a video table 418, values stored within the message annotations 420 may point to data stored in an annotation table 422, values stored within the message story identifier 428 may point to data stored in a story table 410, and values stored within the message sender identifier 432 and the message receiver identifier 434 may point to user records stored within an entity table 404.

Figure 5:
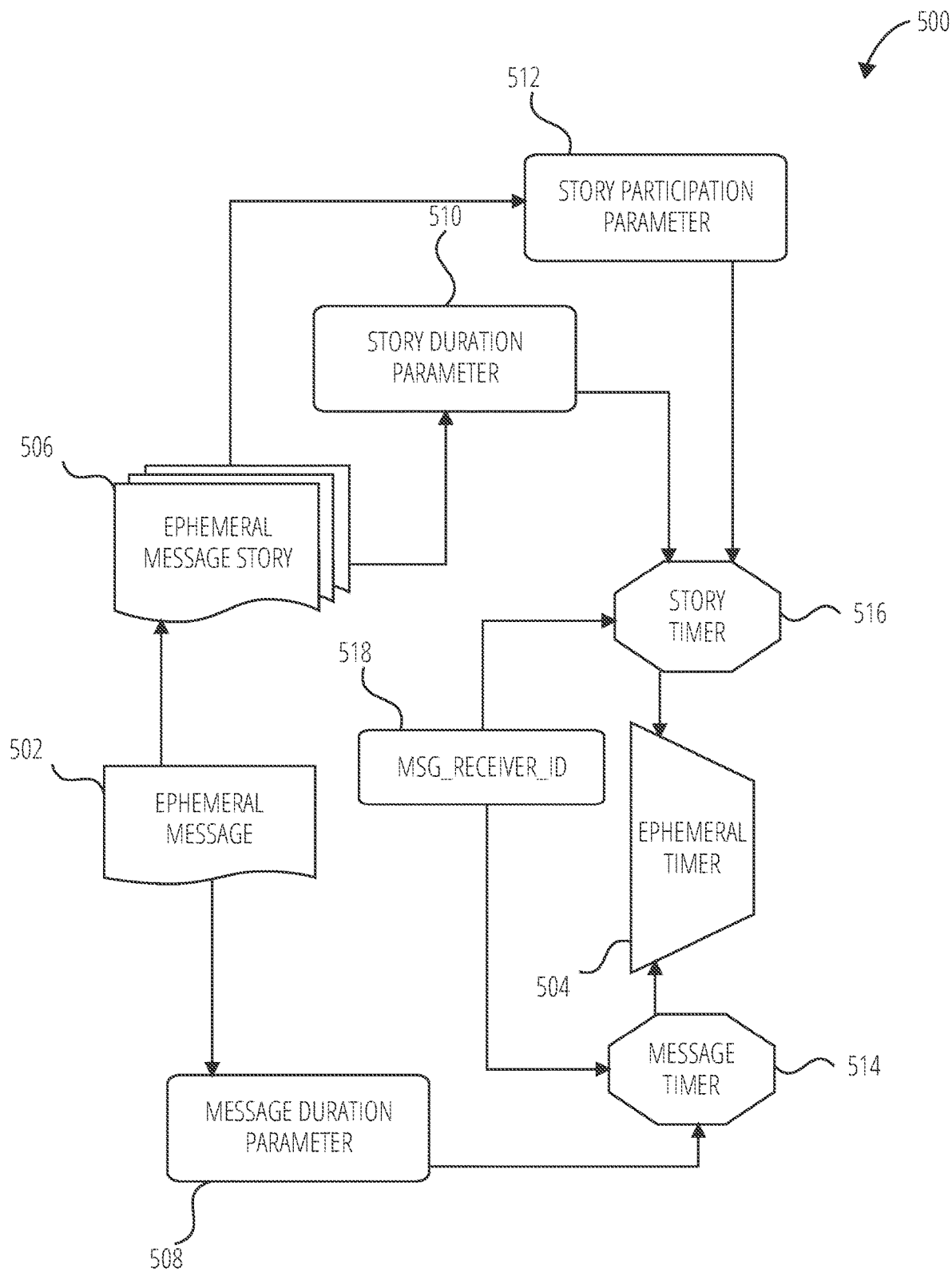
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 506) may be time-limited (e.g., made ephemeral).

An ephemeral message 502 is shown to be associated with a message duration parameter 508, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 508.

The message duration parameter 508 and the message receiver identifier 518 are shown to be inputs to a message timer 514, which is responsible for determining the amount of time that the ephemeral message 502 is shown to a particular receiving user identified by the message receiver identifier 518. In particular, the ephemeral message 502 will only be shown to the relevant receiving user for a time period determined by the value of the message duration parameter 508. The message timer 514 is shown to provide output to a more generalized ephemeral timer system 504, which is responsible for the overall timing of display of content (e.g., an ephemeral message 502) to a receiving user.

The ephemeral message 502 is shown in FIG. 5 to be included within an ephemeral message story 506 (e.g., a personal story, or an event story). The ephemeral message story 506 has an associated story duration parameter 510, a value of which determines a time-duration for which the ephemeral message story 506 is presented and accessible to users of the messaging system 100. The story duration parameter 510, for example, may be the duration of a music concert, where the ephemeral message story 506 is a collection of content pertaining to that concert. Alternatively, a user (either the owning user or a curator user) may specify the value for the story duration parameter 510 when performing the setup and creation of the ephemeral message story 506.

Additionally, each ephemeral message 502 within the ephemeral message story 506 has an associated story participation parameter 512, a value of which determines the duration of time for which the ephemeral message 502 will be accessible within the context of the ephemeral message story 506. Accordingly, a particular ephemeral message story 506 may "expire" and become inaccessible within the context of the ephemeral message story 506, prior to the ephemeral message story 506 itself expiring in terms of the story duration parameter 510. The story duration parameter 510, story participation parameter 512, and message receiver identifier 518 each provide input to a story timer 516, which operationally determines, firstly, whether a particular ephemeral message 502 of the ephemeral message story 506 will be displayed to a particular receiving user and, if so, for how long. Note that the ephemeral message story 506 is also aware of the identity of the particular receiving user as a result of the message receiver identifier 518.

Accordingly, the story timer 516 operationally controls the overall lifespan of an associated ephemeral message story 506, as well as an individual ephemeral message 502 included in the ephemeral message story 506. In one embodiment, each ephemeral message 502 within the ephemeral message story 506 remains viewable and accessible for a time-period specified by the story duration parameter 510. In a further embodiment, a certain ephemeral message 502 may expire, within the context of ephemeral message story 506, based on a story participation parameter 512. Note that a message duration parameter 508 may still determine the duration of time for which a particular ephemeral message 502 is displayed to a receiving user, even within the context of the ephemeral message story 506. Accordingly, the message duration parameter 508 determines the duration of time that a particular ephemeral message 502 is displayed to a receiving user, regardless of whether the receiving user is viewing that ephemeral message 502 inside or outside the context of an ephemeral message story 506.

The ephemeral timer 504 may furthermore operationally remove a particular ephemeral message 502 from the ephemeral message story 506 based on a determination that it has exceeded an associated story participation parameter 512. For example, when a sending user has established a story participation parameter 512 of 24 hours from posting, the ephemeral timer 504 will remove the relevant ephemeral message 502 from the ephemeral message story 506 after the specified 24 hours. The ephemeral timer 504 also operates to remove an ephemeral message story 506 either when the story participation parameter 512 for each and every ephemeral message 502 within the ephemeral message story 506 has expired, or when the ephemeral message story 506 itself has expired in terms of the story duration parameter 510.

In certain use cases, a creator of a particular ephemeral message story 506 may specify an indefinite story duration parameter 510. In this case, the expiration of the story participation parameter 512 for the last remaining ephemeral message 502 within the ephemeral message story 506 will determine when the ephemeral message story 506 itself expires. In this case, a new ephemeral message 502, added to the ephemeral message story 506, with a new story participation parameter 512, effectively extends the life of an ephemeral message story 506 to equal the value of the story participation parameter 512.

Responsive to the ephemeral timer 504 determining that an ephemeral message story 506 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 506 to no longer be displayed within a user interface of the messaging client application 104. Similarly, when the ephemeral timer system 202 determines that the message duration parameter 508 for a particular ephemeral message 502 has expired, the ephemeral timer system 202 causes the messaging client application 104 to no longer display an indicium (e.g., an icon or textual identification) associated with the ephemeral message 502.

Figure 6:
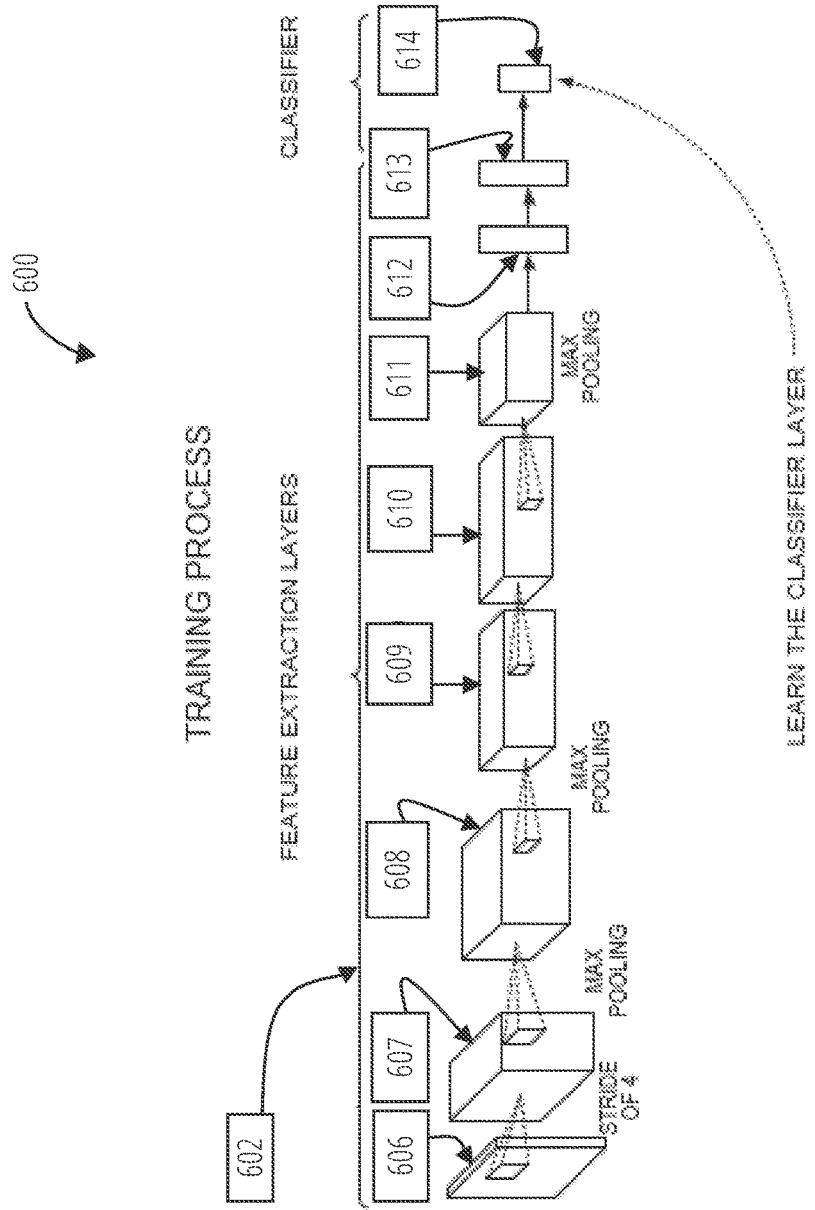
FIG. 6 is a diagrammatic illustration of a feature-extraction process and classifier training, according to some example embodiments.

Turning now to the human pose tracking framework 124, the human pose tracking framework 124 uses convolutional neural networks (CNN). Features in a neural network are the variables or attributes in a data set that can be used as predictors by the CNN. FIG. 6 illustrates the feature-extraction process and classifier training 600, according to some example embodiments. Training the classifier may be divided into feature extraction layers 602 and classifier layer 614. Each image is analyzed in sequence by multiple layers 606-613 in the feature-extraction layers 602.

Feature extraction is a process to reduce the amount of resources required to describe a large set of data. When performing analysis of complex data, one of the problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

Feature extraction may start from an initial set of measured data and builds derived values (features) intended to be informative and non-redundant, facilitating the subsequent learning and generalization steps. Further, feature extraction is related to dimensionality reduction, such as by reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. Convolutional neural networks (CNN) use a stack of layers, where each layer performs a function. For example, the layer could be a convolution, a non-linear transform, the calculation of an average, etc. Eventually this convolutional neural network produces outputs by classifier layer 614. In FIG. 6, the data travels from left to right and the features are extracted. The goal of training the neural network is to find the parameters of all the layers that make them adequate for the desired task.

The structure of each layer may be predefined. For example, a convolution layer may contain small convolution kernels and their respective convolution parameters, and a summation layer may calculate the sum, or the weighted sum, of two pixels of the input image. Training assists in defining the weight coefficients for the summation.

Figure 7:
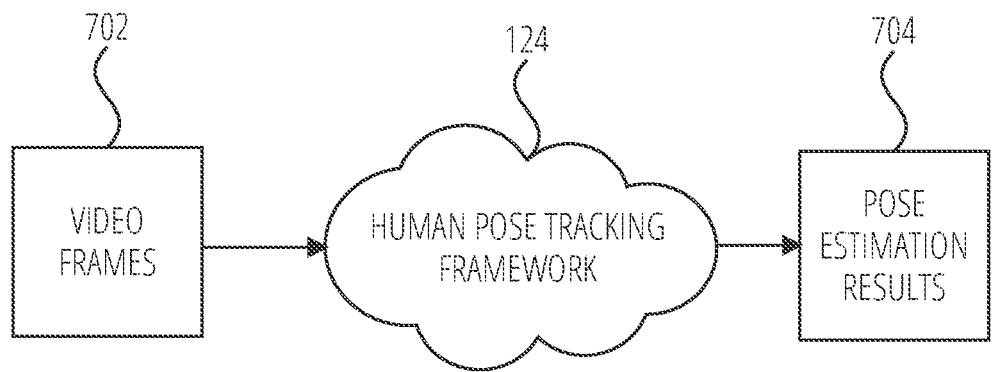
FIG. 7 is a block diagram illustrating a human pose tracking framework, according to some example embodiments.

Turning now to FIG. 7, FIG. 7 is a block diagram illustrating a human pose tracking framework according to some example embodiments. The human pose tracking framework 124 receives video frames 702 as input and outputs pose estimation results 704 for each input frame. The pose estimation results 704 relate to the joint locations of the human across video frames.

The human pose tracking framework 124 tracks articulated body joints in monocular videos. In one example embodiment, the human pose tracking framework 124 is optimized by leveraging temporal information from the video frames 702 to compute pose estimation results 704. The temporal information may improve accuracy for joint localization in frames and improve the consistency of joint localization across the frames. As a result, the temporal information improves the efficiency of a human pose tracking framework 124.

Figure 8:
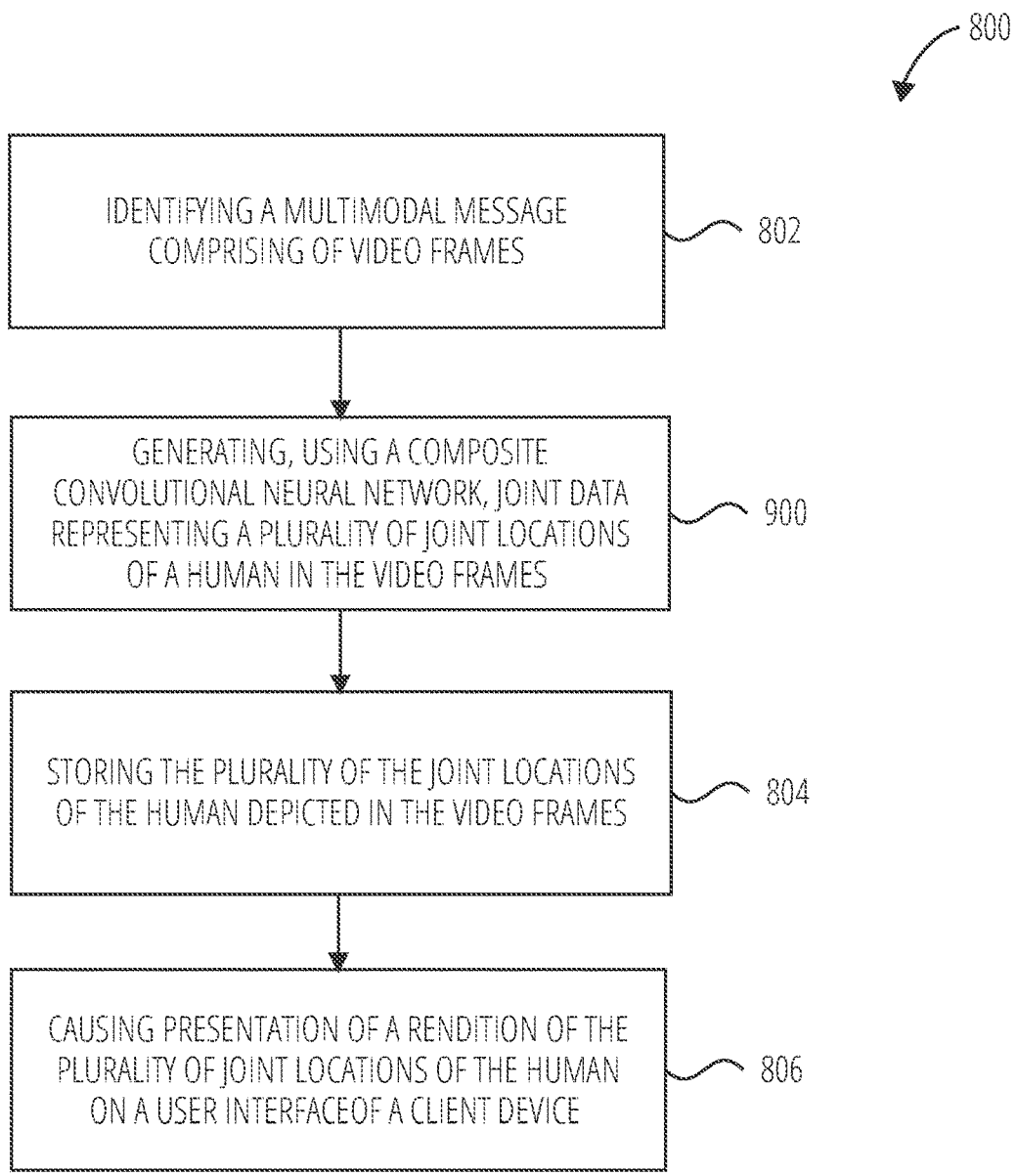
FIG. 8 is a flow diagram illustrating a human pose tracking framework, according to some example embodiments.

FIG. 8 is a flowchart illustrating a method 800, according to some example embodiments, to process video frames. While the method 800 is described within the context of a multimodal message and the messaging system 100, the described operations could be performed with respect to video frames in other contexts.

At operation 802, the human pose tracking framework 124 identifies a multimodal message comprising of video frames. The multimodal message may be in the form of an ephemeral message 502 or an ephemeral message story 506.

At operation 900, the human pose tracking framework 124 generates joint data representing multiple joint locations of a human in the video frames, using a composite convolutional neural network. In a convolutional neural network, the units within a hidden layer are divided into "feature maps." The following paragraphs use "feature maps" and "features" interchangeably.

Figure 9:
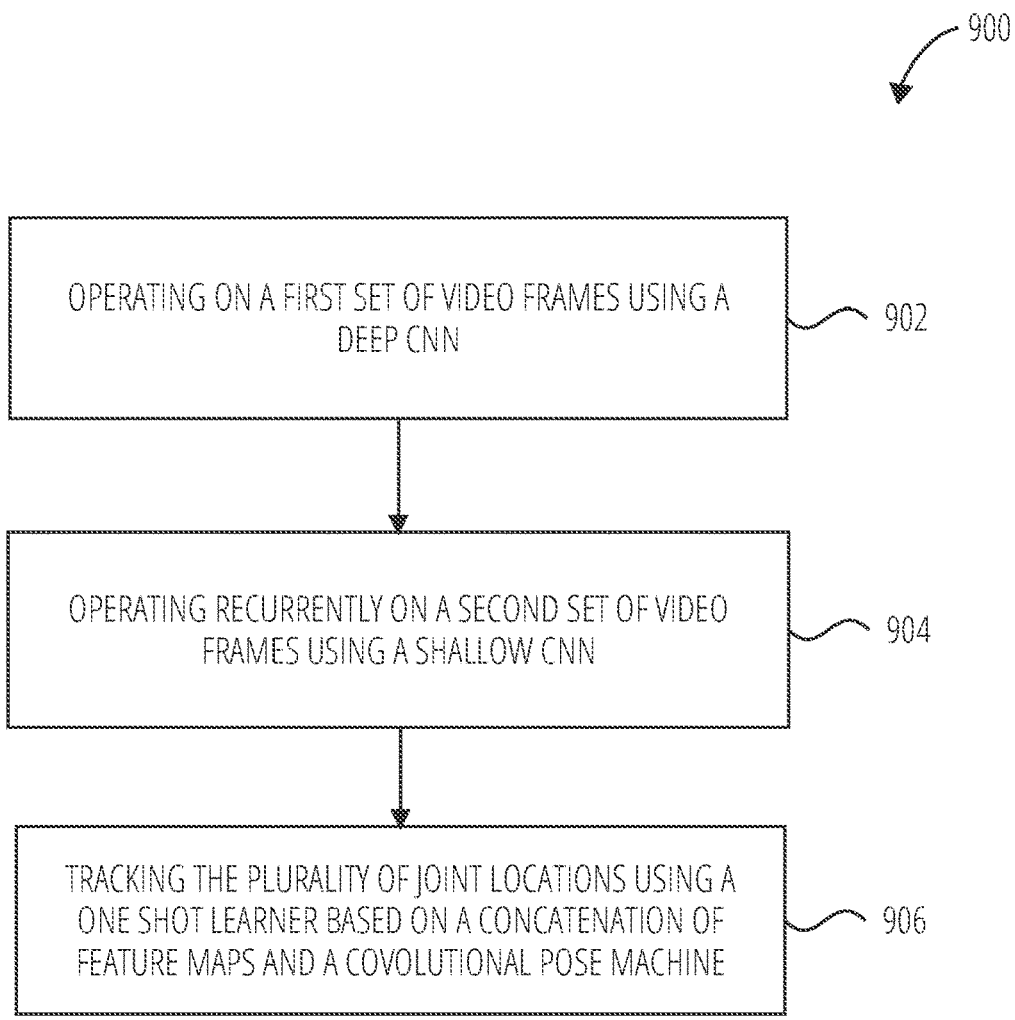
FIG. 9 is a flow diagram illustrating a human pose tracking framework, according to some example embodiments.
Figure 10:
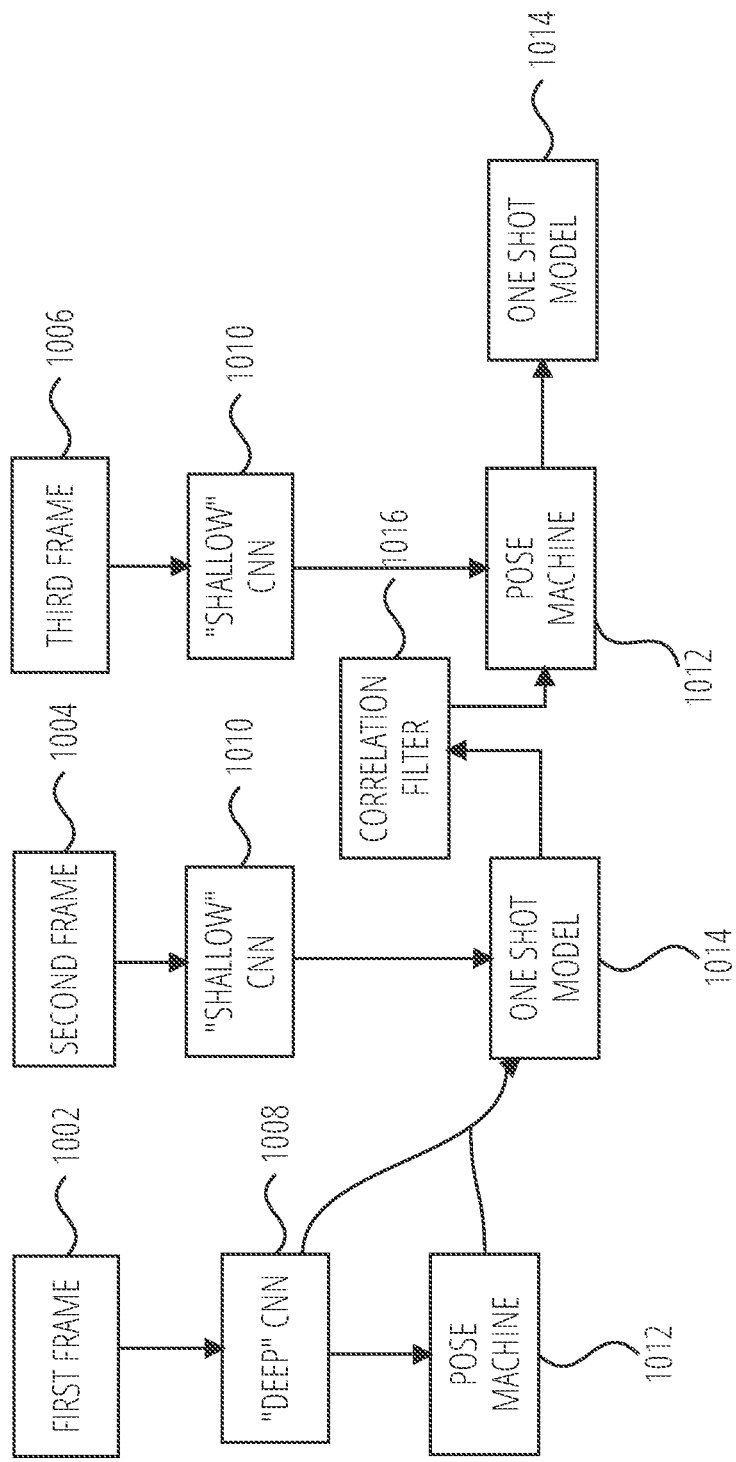
FIG. 10 is a diagrammatic illustration of a human pose tracking system according to an example embodiment.

To further expand upon operation 900, references nominated to FIG. 9 and FIG. 10. As shown in FIG. 10, the human pose tracking framework 124 processes two sets of video frames. The first set of video frames includes an initial video frame (e.g., first frame 1002). The second set of video frames includes subsequent video frames that appear after an initial video frame (e.g., second frame 1004, third frame 1006)

The human pose tracking framework 124 receives a first frame 1002 for which it has no temporal information. At operation 902, the first frame 1002 is inputted into a "deep" convolutional neural network (e.g., "deep" CNN 1008). The first frame 1002 is inputted into the "deep" CNN 1008 to initialize the pose tracking. The "deep" CNN 1008 extracts features from the first frame 1002 and inputs the features into a pose machine 1012. Once the human pose tracking framework 124 has an initial pose estimation, the human pose tracking framework 124, at operation 904, extract features from each of subsequent second frame 1004 and subsequent third frame 1006 using a "shallow" CNN 1010. In some example embodiment, a "deep" CNN 1008 may be used to extract features from the second frame 1004 or the third frame 1006. In one example embodiment, the "deep" CNN 1008 includes additional deconvolution layers. These additional deconvolution layers may improve the performance of the human pose tracking framework 124 by upsampling the feature maps.

The "deep" CNN 1008 may consist of more convolutional layers than the "shallow" CNN 1010. For example, the "deep" CNN 1008 may contain 50 layers, while the "shallow" CNN 1010 includes three convolution layers. In another example embodiment, "deep" CNN may contain at least five convolution layers.

Returning to FIG. 9, at operation 906, the human pose tracking framework 124 tracks multiple joint location using a one-shot learner neural network (e.g., one-shot model 1014) based on a concatenation of feature maps and a convolutional pose machine 1012. The convolutional pose machine 1012 is a pose machine implemented using a "shallow" convolutional neural network. Specifically, the pose machine 1012 consists of a convolutional pose machine. For a full explanation of convolutional pose machines refer to "Convolutional Pose Machines" by The Robotics Institute, Carnegie Mellon University. The pose machine 1012 receives the image features extracted by the "deep" CNN 1008 as input and outputs estimates of human skeleton coordinates. The image features extracted by the "deep" CNN 1008 may be fused with the estimates of human skeleton coordinates and subsequently, inputted into the one-shot model 1014. Fusing the extracted image features and estimates of human skeleton coordinates may be beneficial in providing the human pose tracking framework 124 with initial pose estimation results 704.

The one-shot model 1014 receives the fused "deep" CNN 1008 features and estimates of human skeleton coordinates as input, and directly outputs a template of key points to a correlation filter 1016 for pose tracking. The template of key points represents human skeleton coordinates of an image patch within the first frame 1002. The one-shot model 1014 may be implemented using a convolutional neural network. The one-shot model 1014 can learn from one or only a few, training objects.

Figure 11:
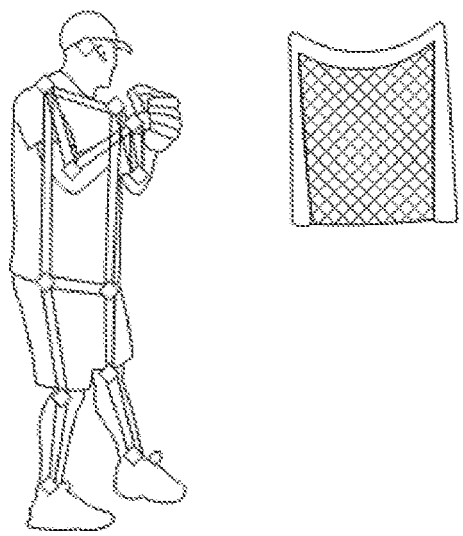
FIG. 11 is a diagrammatic illustration of joint localization according to an example embodiment.

FIG. 11 is a diagrammatic representation of joint localization 1100 according to an example embodiment. Addition of the one-shot model 1014 in the human pose tracking framework 124 improves the human pose tracking framework 124 by achieving more accurate and stable pose estimation results 704, as depicted in FIG. 11. Unlike using an LSTM or a "shallow" CNN, the one-shot model 1014 is capable of propagating the long-range temporal information within the video frames 702. Thus, with the one-shot model, 1014 the human pose tracking framework 124 may effectively leverage temporal information and improve the pose estimation results 704.

An example formula for the correlation filter 1016 may be as follows:

$$\hat{G}_{k,l,m} = \sum_{i,j} \hat{K}_{i,j,m} \cdot F_{k+i-1,l+j-1,m}$$

In one example embodiment, the correlation filter 1016 may be used to track articulated body joints through rotations, occlusions or other appearance changes across video frames. The correlation filter 1016 may be trained from a single frame and dynamically adapted as the articulated body joints change across video frames. In another example embodiment, the correlation filter 1016 may receive the templates of the key points from the one-shot model 1014 and the second frame 1004 as input. The correlation filter 1016 may compute the correlation between the template of the previous frame, and the subsequent frame to produce updated pose estimation results 704. This process may be recurrently and sequentially exploited by the human pose tracking framework 124 to the remaining frames in the video for human pose tracking.

Returning to FIG. 8 having completed a description of operation 900, at operation 804, the human pose tracking framework 124 stores the pose estimation results 704. The pose estimation results 704 may be transmitted to the messaging client application 104. At operation 806, the human pose tracking framework 124 may transmit the pose estimation results 704, as part of user interface data, for presentation as graphical data on a graphical user interface presented by the messaging client application 104. The graphical data may for example be a rendition of the pose estimation results 704 that consist of alphanumeric characters or an image.

Figure 12:
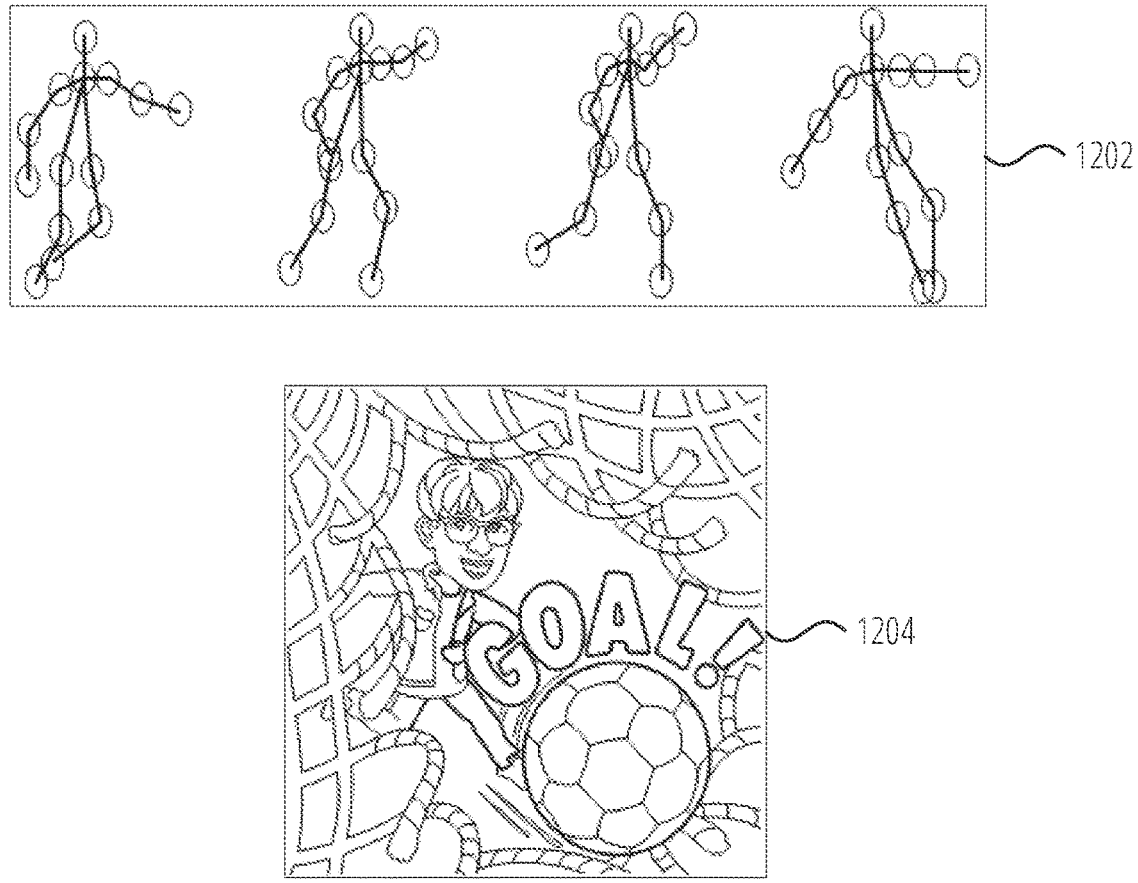
FIG. 12 is a diagrammatic illustration of graphical data, according to an example embodiment.

FIG. 12 is a diagrammatic illustration of graphical data 1200 according to an example embodiment. In one example embodiment, the graphical data is an image with a character icon 1204 of the human in the video frames 702. In another example embodiment, the graphical data is presented as an image overlay. The graphical data may be transmitted as an ephemeral message 502 or an ephemeral message story 506.

Figure 13:
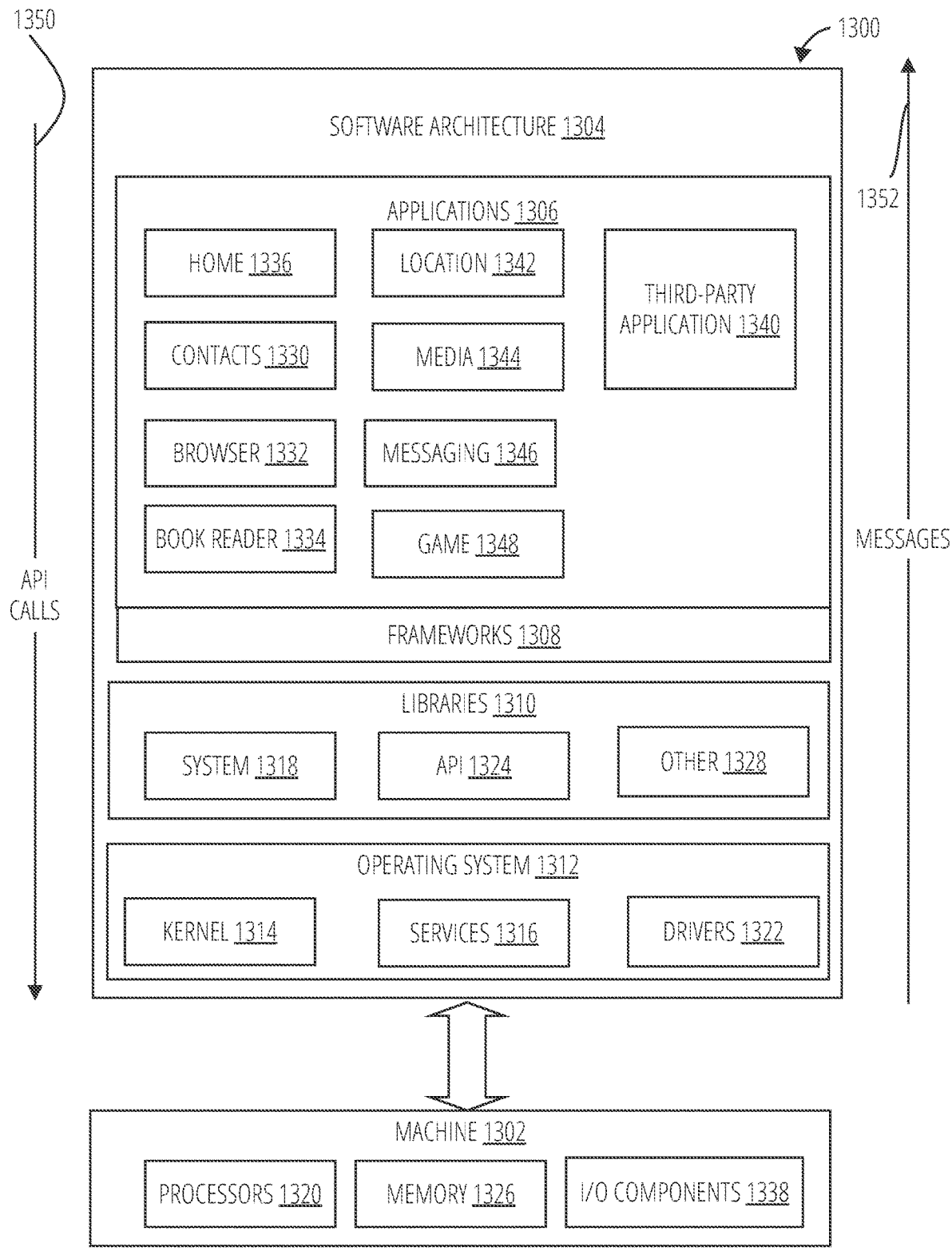
FIG. 13 is a block diagram showing a software architecture within which the present disclosure may be implemented, in accordance with some example embodiments.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1310 provide a low-level common infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example embodiment, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Figure 14:
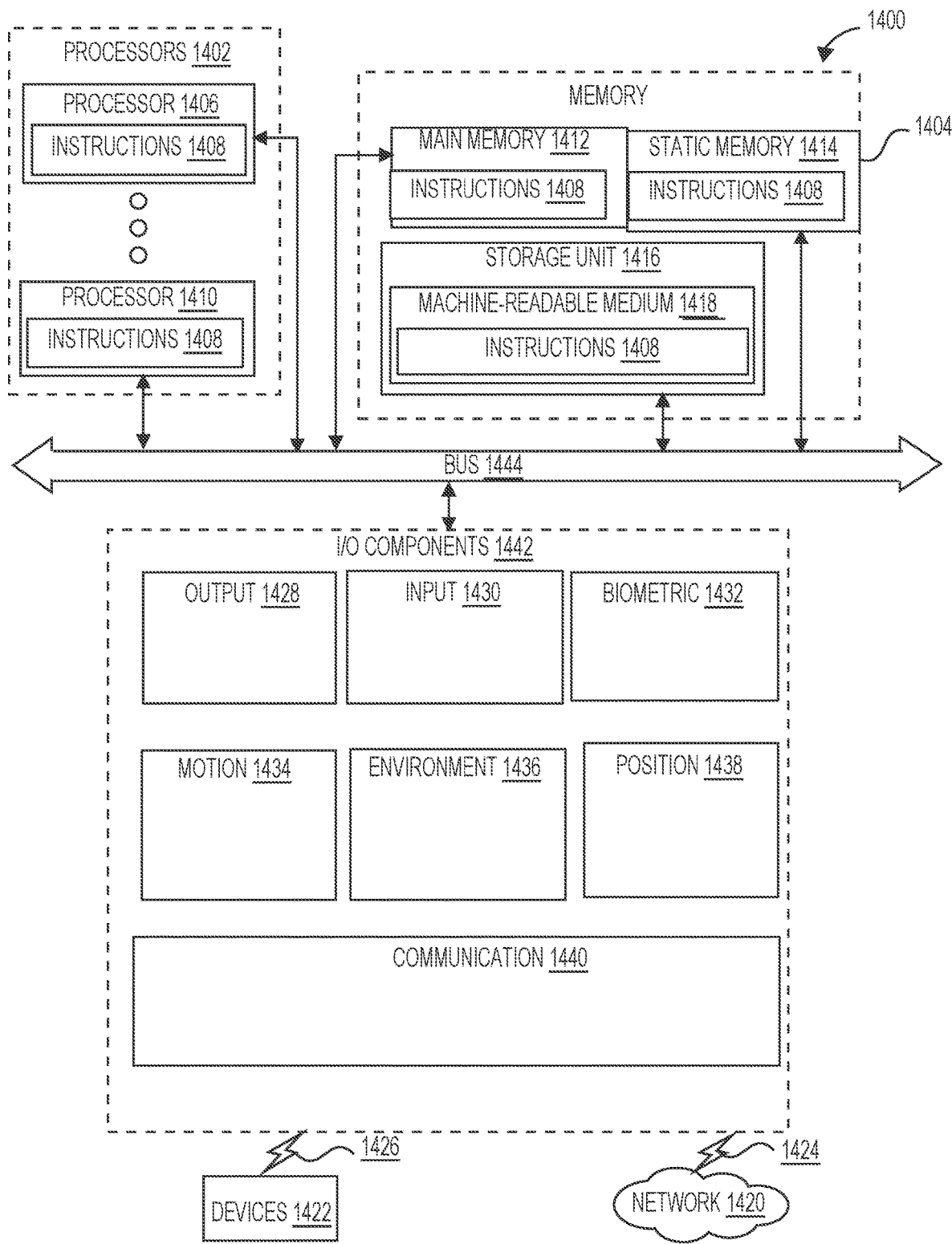
FIG. 14 is a diagrammatic representation of a machine in the form of a computer system within which a set of instructions may be executed for causing the machine to perform any one or more of the methodologies discussed herein, in accordance with some example embodiments.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1442, which may be configured to communicate with each other via a bus 1444. In an example embodiment, the processors 1402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1406 and a processor 1410 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the processor's cache memory), or any suitable combination thereof, during execution thereof by the machine 1400.

Furthermore, the machine-readable medium is a tangible non-transitory machine-readable medium in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1442 may include a wide variety of components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various example embodiments, the I/O components 1442 may include output components 1428 and input components 1430. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface component or another suitable device to interface with the network 1420. In further examples, the communication components 1440 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional barcodes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

What is claimed is:

1. A method comprising:
generating joint data representing a plurality of joint locations of a human depicted in a plurality of video frames comprising a first set of video frames and a second set of video frames, the generating of the joint data comprising tracking the plurality of joint locations using a learner neural network that is trained to track the plurality of joint locations based on a concatenation of:
feature maps corresponding to the plurality of video frames; and
pose estimation results produced by a trained convolutional pose machine, the pose estimation results corresponding to the plurality of joint locations in the plurality of video frames; and
generating updated pose estimation results using a correlation between the first set of video frames and the second set of video frames, the correlation being computed based on the concatenation and the second set of video frames.

2. The method of claim 1, further comprising:
operating on the first set of video frames using a first type of neural network.

3. The method of claim 2, further comprising:
operating on the second set of video frames using a second type of neural network.

4. The method of claim 3, wherein the first type of neural network is different than the second type of neural network.

5. The method of claim 3, wherein the first type of network is a deep convolutional neural network and the second type of neural network is a shallow convolutional neural network.

6. The method of claim 5, wherein a number of layers in the deep convolutional neural network is at least five.

7. The method of claim 5, wherein the deep convolutional neural network has a deconvolution layer, the deconvolution layer up-sampling at least one feature map.

8. The method of claim 3, wherein the feature maps are produced by the first type of convolutional neural network and the second type of convolutional neural network.

9. The method of claim 1, wherein the learner neural network is a one shot learner neural network.

10. The method of claim 1, further comprising:
generating, based on the concatenation, a template of key points representing the plurality of joint locations; and
generating updated pose estimation results based on the template of key points.

11. The method of claim 10, wherein:
computing the correlation between the first set of video frames and second set of video frames comprises using a correlation filter; and
the template of key points is directly outputted to the correlation filter.

12. The method of claim 1, further comprising storing the updated pose estimation results of the human depicted in the plurality of video frames.

13. The method of claim 1, wherein:
the first set of video frames includes a first video frame; and
the second set of video frames includes at least one subsequent video frame that appears after the first video frame in a sequence of frames.

14. The method of claim 1, wherein the learner neural network is a convolutional neural network.

15. The method of claim 1, further comprising causing presentation of the updated pose estimation results of the human on a user interface of a client device.

16. A system comprising:
at least one processor; and
a memory storing instructions that, when executed by the at least one processor, configure the system to perform operations comprising:
generating joint data representing a plurality of joint locations of a human depicted in a plurality of video frames comprising a first set of video frames and a second set of video frames, the generating of the joint data comprising tracking the plurality of joint locations using a learner neural network that is trained to track the plurality of joint locations based on a concatenation of:
feature maps corresponding to the plurality of video frames; and pose estimation results produced by a trained convolutional pose machine, the pose estimation results corresponding to the plurality of joint locations in the plurality of video frames; and generating updated pose estimation results using a correlation between the first set of video frames and the second set of video frames, the correlation being computed based on the concatenation and the second set of video frames.

17. The system of claim 16, the operations further comprising:
operating on the first set of video frames using a first type of neural network; and
operating on the second set of video frames using a second type of neural network,
wherein the first type of convolutional neural network is different than the second type of convolutional neural network.

18. The system of claim 17, wherein the first type of convolutional network is a deep convolutional neural network and the second type of convolutional neural network is a shallow convolutional neural network.

19. The system of claim 16, further comprising generating, based on the concatenation, a template of key points representing the plurality of joint locations; and wherein:
computing the correlation between the first set of video frames and second set of video frames comprises using a correlation filter; and
generating updated pose estimation results comprises generating updated pose estimation results based on the template of key points.

20. A non-transitory computer-readable storage medium, the computer-readable storage medium including instructions that when executed by a computer, cause the computer to perform operations comprising:
generating, using a composite convolutional neural network, joint data representing a plurality of joint locations of a human depicted in a plurality of video frames comprising a first set of video frames and a second set of video frames, the generating of the joint data by the composite convolutional neural network comprising:
generating joint data representing a plurality of joint locations of a human depicted in a plurality of video frames comprising a first set of video frames and a second set of video frames, the generating of the joint data comprising tracking the plurality of joint locations using a learner neural network that is trained to track the plurality of joint locations based on a concatenation of:
feature maps corresponding to the plurality of video frames; and
pose estimation results produced by a trained convolutional pose machine, the pose estimation results corresponding to the plurality of joint locations in the plurality of video frames; and
generating updated pose estimation results using a correlation between the first set of video frames and the second set of video frames, the correlation being computed based on the concatenation and the second set of video frames.

* * * * *